United States Patent
Mongoin et al.

(10) Patent No.: US 8,440,754 B2
(45) Date of Patent: *May 14, 2013

(54) USE AS A RHEOLOGY AGENT IN A FILLED PLASTIC PASTE OF A DRY-GROUND CALCIUM CARBONATE WITH A COPOLYMER OF (METH)ACRYLIC ACID WITH AN ALKOXY OR HYDROXY POLYALKYLENEGLYCOL GROUP

(75) Inventors: Jacques Mongoin, Quincieux (FR); Christian Jacquemet, Lyons (FR); Jean-Marc Suau, Lucenay (FR); Olivier Guerret, La Tour de Salvagny (FR); Patrick Trouve, Clamart (FR)

(73) Assignee: Coatex S.A.S., Genay (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,882

(22) Filed: Sep. 6, 2011

(65) Prior Publication Data
US 2012/0053280 A1 Mar. 1, 2012

Related U.S. Application Data

(63) Continuation of application No. 12/522,968, filed as application No. PCT/IB2008/000539 on Feb. 26, 2008, now abandoned.

(30) Foreign Application Priority Data

Mar. 5, 2007 (FR) ...................................... 07 01592

(51) Int. Cl.
*C08K 3/14* (2006.01)
*C08K 3/22* (2006.01)
*C01F 11/18* (2006.01)

(52) U.S. Cl.
USPC ............................ 524/427; 524/425; 423/430

(58) Field of Classification Search ................... 524/425, 524/427; 423/430
See application file for complete search history.

(56) References Cited

U.S. PATENT DOCUMENTS

| | | | |
|---|---|---|---|
| 4,013,602 | A | 3/1977 | Delfosse et al. |
| 4,835,195 | A | 5/1989 | Rayfield et al. |
| 5,015,295 | A | 5/1991 | Lamond |
| 2004/0019148 | A1 | 1/2004 | Suau et al. |
| 2009/0312459 | A1 | 12/2009 | Gane et al. |
| 2009/0324979 | A1 | 12/2009 | Roussel et al. |

FOREIGN PATENT DOCUMENTS

| | | |
|---|---|---|
| JP | 01-151955 | 6/1989 |
| JP | 1-151955 | 6/1989 |
| WO | 01/96007 | 12/2001 |

OTHER PUBLICATIONS

U.S. Appl. No. 13/226,906, filed Sep. 7, 2011, Suau, et al.
U.S. Appl. No. 13/226,879, filed Sep. 7, 2011, Suau, et al.
Prescott, P.I. and Pruett, R.J., "Ground calcium carbonate: Ore mineralogy, processing and markets.", Mining Engineering, pp. 79-84 (Jun. 1996).

*Primary Examiner* — John Uselding
(74) *Attorney, Agent, or Firm* — Oblon, Spivak, McClelland, Maier & Neustadt, L.L.P.

(57) ABSTRACT

The invention resides in the use, as an agent reducing the viscosity of a thermoplastic or thermosetting paste filled with a calcium carbonate, of a calcium carbonate characterized in that it is obtained by dry-grinding, firstly, and in that it is dry-ground in the presence of a grinding aid agent which is a copolymer of (meth)acrylic acid with a monomer containing an alcoxy or hydroxy polyalkyleneglycol group, secondly. The invention also concerns the filled thermoplastic and thermosetting pastes obtained in this manner.

19 Claims, No Drawings

USE AS A RHEOLOGY AGENT IN A FILLED PLASTIC PASTE OF A DRY-GROUND CALCIUM CARBONATE WITH A COPOLYMER OF (METH)ACRYLIC ACID WITH AN ALKOXY OR HYDROXY POLYALKYLENEGLYCOL GROUP

This is a continuation application of U.S. application Ser. No. 12/522,968, filed Jul. 13, 2009, which is a 371 of PCT/IB08/000539 filed on Feb. 26, 2008.

The present invention concerns the field of thermoplastic and thermosetting materials, where the said materials are filled with a mineral matter which is a calcium carbonate obtained by dry grinding.

Thermoplastic and thermosetting materials are used in many manufactured objects, since their methods of extrusion by injection, pressing or casting enable them to be used easily. These materials generally contain a high concentration of mineral filler such as calcium carbonate, and possibly glass fibres, which both enable the optical and mechanical properties of these materials to be modified whilst optimising their cost: the term used is therefore that of "filled materials".

Generally speaking the mineral filler and possible glass fibres are blended with the thermoplastic or thermosetting resin, and also with various other additives such as catalysts, pigments or mould-removal agents, before a polymerisation stage: in the remainder of the Application such a blend will be called a "paste". Therefore, both for the stage of manufacture of the paste by blending, and for the transport of the said paste to the device where the polymerisation and/or transformation reaction takes place (such as a compression or injection press-mould, but also an extruding machine, etc.), it is important that the viscosity of the said paste should be sufficiently low, in order to make possible the stage of the blending of the constituents of the paste, its handling and its introduction into the polymerisation and/or transformation device.

The search for such rheological properties is absolutely fundamental in the case of unsaturated polyester resins, which constitute one of the 2 preferential thermosetting materials referred to by the present Application. There are many techniques for transforming unsaturated polyesters: casting, projection, RTM (Resin Transfer Moulding), SMC (Sheet Moulding Compound), BMC (Bulk Moulding Compound), etc. However, there are 2 large families of processes leading to the manufacture of unsaturated and filled polyester materials: SMC (Sheet Molding Compound) and BMC (Bulk Moulding Compound).

The manufacture of parts using SMC requires two stages. The first stage, called the SMC production stage, consists in obtaining a preimpregnated product resulting from the association of glass fibres and a filled thermosetting resin paste which is poured on to these fibres. The second stage, called the SMC compression stage, is that of casting in a hot press. During this shaping operation the combined action of temperature and mechanical pressure allows the mould to be filled by SMC and also allows it to be interlaced.

Unlike SMCs, BMCs are obtained by a first stage which is a direct blending between the glass fibres and the filled thermosetting resin paste. They are presented in the form of a "bulk compound", also called a "sauerkraut". During a second stage these compounds are injected using a pump as far as the cast, where the interlacing occurs under the action of pressure and temperature. It is therefore easy to understand the requirement of the skilled man in the art to regulate the viscosity of the paste to a sufficiently low value, in order to obtain a paste which can be handled and easily blended with the glass fibres, and which easily and completely fills the mould in which the end piece is produced.

At the same time, in the case of filled polyurethane resins which constitute the other preferential thermosetting material referred to by the present Application, the search for a low viscosity is also one of the preoccupations of the skilled man in the art. Indeed, it is known that polyurethane foams result from the intimate blending between a suspension of polyol containing a mineral filler and various reactive additives, with a polyisocyanate compound, which produces a paste and then a foam after the polymerisation reaction. And the viscosity of the polyisocyanate compound is much lower than that of the polyol: with a view to obtaining an intimate blend, which is easy to produce from these 2 compounds, it is important to lower the viscosity of the polyol suspension containing the mineral filler. By this means, the viscosity of the polyurethane paste is also reduced (after blending between the polyisocyanate and the filled and reduced viscosity polyol suspension), which facilitates the handling of the said paste until its polymerisation.

Finally, in the case of the thermoplastic materials preferentially referred to by the present Application, i.e. PVCs, it is also essential to minimise the viscosity of the PVC paste containing a mineral filler: this is notably the case with plastisols. Firstly, a low viscosity will enable the said paste to be handled easily, and enable it, notably, to be conveyed from the manufacturing tanks to the transformation tool without risk of sedimentation or clogging of the conveyance devices. Secondly, too high a viscosity can lead to bubbles inside the said filled paste, which impairs the final properties of the plastisol obtained.

Generally speaking, this requirement to reduce the viscosity of the filled paste is counterbalanced by the fact that the said paste contains a mineral material which is calcium carbonate: indeed, it has been well known for many years that calcium carbonate tends to increase the viscosity of a polyester resin in which it is incorporated. This is, notably, indicated in the document "Flow properties of calcium carbonate filled polyester resins" ($31^{st}$ annual technical conference, Reinforced Plastics/Composites Institute, The Society of the Plastics Industry, Inc., section 8-D, 1976, pp 1-8). Therefore, the technical problem which the skilled man in the art must resolve is that of incorporating calcium carbonate in a thermoplastic or thermosetting resin without increasing the viscosity of the paste obtained in this manner.

The first responses made to this problem consisted in developing calcium carbonate treatment agents. Thus, document EP 0 153 193 A1 describes a carbonate filler which is ground and then treated using an aliphatic carboxylic acid, the molecule of which has at least 8 carbon atoms. The calcium carbonate then obtained and used in an unsaturated or PVC polyester resin does not increase the viscosity of the paste formed in this manner. At the same time, document FR 2 531 971 describes calcium carbonates obtained by grinding which are surface treated by fatty alcohols chosen from among octanol-1, decanol-1, dodecanol-1, tridecanol-1, tetradecanol-1 and their blends. The examples given in this document demonstrate that the viscosity of the polyester pastes containing the said calcium carbonates is lower than that of the pastes obtained according to the prior art. One can also cite document WO 2005/026252, which describes the treatment of previously ground calcium carbonate, using an amino acid or aminophosphate compound: a mineral filler treated and used in this manner in polyester pastes enables its viscosity to be reduced. However, these solutions involve the use of an additional stage of treatment of calcium carbonate which is costly both in terms of the treatment agent and the treatment device. Finally, one can cite document WO 2006/100510, which describes a dispersion of mineral filler (such as calcium carbonate) in a non-aqueous medium, with a view to its use in a plastic, where the said dispersion has a Bohlin™ viscosity of less than 150 Pa·s. This dispersion is characterised in that it contains a dispersing agent which is a polymer having a fatty chain with at least 12 carbon atoms, possibly in combination with stearic acid as a hydrophobing agent of the mineral filler.

The skilled man in the art has identified a second type of solutions to the technical problem as described above: these solutions are based on the use of calcium carbonates with particular granulometric characteristics. Thus, the publications "Flow properties of calcium carbonate filled polyester resins" ($31^{st}$ annual technical conference, Reinforced Plastics/Composites Institute, The Society of the Plastics Industry, Inc., 1976, pp 1-8) previously cited in the present Application and "A study of the influence of specific variables on viscosity relationships and surface properties of SMC formulations based on special calcium carbonate fillers" ($32^{st}$ annual technical conference, Reinforced Plastics/Composites Institute, The Society of the Plastics Industry, Inc., section 7-B, 1976, pp 1-8) attempted to link the viscosity of the polyester pastes containing calcium carbonate to the distribution of particle sizes of the said carbonate, and notably to their compactness.

More recently, document JP 56104920 described a blend of 2 calcium carbonates, the median diameters of which are less than 2 µm and 10 µm, used in a polyester resin. The teaching of this document is that it is the existence of this twin population of sizes of calcium carbonate particles which enables the viscosity of the pastes to be reduced, without impairing the properties of the end product. However, these solutions present the disadvantage of limiting the skilled man in the art to a particular choice of calcium carbonates with very specific granulometric characteristics, obtained by operations to grind, classify or blend different populations of particle sizes.

The skilled man in the art has also worked on the nature of the calcium carbonate grinding process: using a dry process and using a wet process. Concerning grinding in a wet medium, which constitutes a third type of solution, the proposed methods could not give full satisfaction, since they lead to an additional cost compared to calcium carbonates obtained by a dry process. Indeed, after having been ground in an aqueous medium, the particles of calcium carbonate had to be dried before being incorporated in the thermoplastic resin, without which the hydrophobic character of the resin made it incompatible with the carbonate filler present in an aqueous medium. And drying is a very costly stage in terms of energy and the equipment used.

Conversely, the skilled man in the art observed that grinding in a dry process led to particles of calcium carbonate which, when they are added to a polyester resin, produced broad variations in terms of the viscosity of the resulting paste (this is clearly indicated in documents U.S. Pat. Nos. 5,102,465 and 5,015,295). He did however succeed in developing a fourth type of solution, based on dry grinding, but which is very restrictive: as indicated in the above-mentioned documents, it is based on the use of dry-ground calcium carbonates, with an impurity content less than 5% of their weight, and of median diameter between 2 µm and 4 µm. Although such calcium carbonates enable the viscosity of the polyester pastes in which they are incorporated to be reduced, their purity and granulometry characteristics appear restrictive for the skilled man in the art. Finally, document EP 0 359 385 A1 constitutes a fifth type of solution, based on a blend of 2 ground calcium carbonates, respectively when dry and in a wet medium, whilst having very particular granulometric characteristics. By this means it is possible to reduce the viscosity of the thermosetting resins (such as polyester) to which these blends are added. Apart from the restrictive nature related to the granulometric characteristics of these 2 calcium carbonates, this solution which uses a calcium carbonate ground by means of a wet process cannot satisfy the skilled man in the art in terms of the cost of production relating to the drying stage.

Consequently, with a view to using a calcium carbonate in a thermoplastic or thermosetting resin, whilst reducing the viscosity of the paste obtained, none of the solutions of the prior art gives the skilled man in the art satisfaction:

the treatment processes represent an additional cost relating to the treatment stage, the use of calcium carbonates with particular granulometric characteristics is too restrictive for the skilled man in the art, the wet grinding processes prove costly, due to the additional stage of drying of the ground mineral filler, the dry grinding processes, with the dry grinding aid agents proposed by the prior art, generally lead to fillers which do not enable the viscosity of the pastes to which they are added to be stabilised, or are associated with purity and granulometry characteristics which are too restrictive for the skilled man in the art.

Therefore, with a view to resolving the previously mentioned technical problem, whilst compensating for the disadvantages associated with the solutions proposed in the state of the technique, the Applicant has developed the use, as an agent reducing the viscosity of a thermoplastic or thermosetting resin paste filled with a calcium carbonate, of a calcium carbonate characterised in that the carbonate is dry-ground in the presence of a grinding aid agent, firstly, and in that the grinding aid agent is also a copolymer consisting:

a) of at least one anionic monomer chosen from among acrylic acid, methacrylic acid and their blends, b) and of at least one non-ionic monomer, of formula (I):

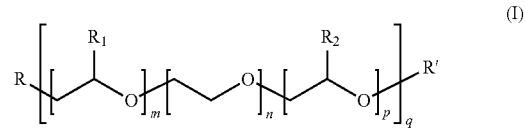

where m, n, p and q are integers such that: m, n, p≦150, q≧1, and 5≦(m+n+p)q≦150, and preferentially 15≦(m+n+p)q≦120, $R_1$ represents hydrogen or the methyl or ethyl radical, $R_2$ represents hydrogen or the methyl or ethyl radical, R represents a radical containing an unsaturated polymerisable group, preferentially belonging to the group of vinylics, or to the group of acrylic, methacrylic, maleic esters, or to the group of unsaturated urethanes such as acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide, R' represents hydrogen or a hydrocarbonated radical with 1 to 40 carbon atoms, preferentially 1 to 4 carbon atoms, where R' is very preferentially the methyl radical,
or a blend of several monomers of formula (I).
c) and possibly of at least one other monomer chosen from among (meth)acrylic anhydride, (meth)acrylamide, or from among the (meth)acrylic esters, such as preferentially the acrylates and methacrylates with 1 to 20 carbon atoms in their ester radical, such as very preferentially the methyl, ethyl, isopropyl, n-propyl, isobutyl, n-butyl, ter-butyl or 2-ethylhexyl acrylates, the methyl or ethyl methacrylates, the hydroxylated methacrylates such as the hydroxyethyl and hydroxypropyl methacrylates, or from among the aromatic vinylic monomers such as preferentially styrene, α-methylstyrene, styrene sulfonate, or acrylamido-2-methyl-2-propane-sulfonic acid, or from among the organophosphate monomers, such as preferentially the acrylate and methacrylate phosphates of ethylene glycol, or the acrylate and methacrylate phosphates of oxyethylene and/or oxypropylene glycol, and their blends.

In the remainder of the application the monomer of formula (I) may be called a monomer with an alcoxy or hydroxy polyalkyleneglycol group.

This solution firstly prevents the disadvantages listed above, relating to solutions based on subsequent treatment of the carbonated filler, on the choice of particular granulometric characteristics for the calcium carbonate, or on grinding methods in a wet medium. Secondly, and in a very surprising manner relative to the state of the technique which taught that calcium carbonates ground in a dry process generally led to modifications of the viscosity of the polyester resins, unless the said calcium carbonate had very particular granulometric and purity characteristics, as revealed in documents U.S. Pat. Nos. 5,102,465 and 5,015,295, the solution proposed by the present invention enables:
  a calcium carbonate ground by a dry process to be used, without restrictive conditions in terms of granulometry or purity,
  by this means the viscosity of the polyester pastes in which they are incorporated to be reduced (notably in comparison with calcium carbonates obtained by dry grinding, with a grinding aid agent of the prior art),
  and without impairing the properties of the end piece, such as its mechanical properties.

One of the merits of the Applicant is based on the fact that it was able to identify an avenue of research which was neither revealed nor suggested by the state of the technique: that of calcium carbonate dry-grinding aid agents. Indeed, none of the above-mentioned documents, which sought to resolve the technical problem forming the subject of the present Application, had stressed that the nature of the grinding aid agent used could have an influence on the viscosity of the filled thermoplastic or thermosetting paste, and could advantageously lead to a reduction of the latter.

Another of its merits is based on the fact that it was able to identify very particular dry-grinding aid agents, which enable the technical problem forming the subject of the present Application to be resolved in an advantageous and surprising manner. Indeed, as the state of the technique relative to the dry-grinding aid agents of calcium carbonate will henceforth demonstrate, this state did not contain any disclosure or teaching likely to lead the skilled man in the art to the technical solution forming the subject of the present Application.

There is a first category of calcium carbonate dry-grinding aid agents, which are weak acids such as formic, acetic, lactic, lignitic, adipic or lactic acids, or fatty acids, and in particular palmitic and stearic acids. In this context, document FR 2 863 914 describes the use of adipic acid during dry grinding of a mineral material such as calcium carbonate, with a view to preventing the subsequent reagglomeration of the said material or the formation of dust during the grinding operation. Similarly, document EP 0 510 890 A1 describes the use of a fatty acid which is more preferentially stearic acid (example 3), with the aim of distributing uniformly the grinding aid additive on the inorganic material.

A second group of dry-grinding aid agents is constituted by the aminated compounds. On this subject, document GB 2 179 268 describes a grinding process in a dry medium of a material, such as calcium carbonate, notably through the use of amines such as alkyl propylene diamine. The goal of this document, which is far removed from that of the present Application, is to improve the efficiency of the grinding operation.

The third group of grinding aid agents is probably the best-known to the skilled man in the art and the most commonly used: it consists of alcohols of the ethylene, diethylene, triethylene, propylene and dipropylene glycol type. Thus, documents WO 2002/081 573 and US 2003/019 399 describe the use of diethylene glycol as a dry-grinding aid agent (see table 1 in each of these documents). One can also mention document WO 2005/026252, which has already been mentioned in the present Application and which, in its examples, uses during a stage of grinding of calcium carbonate a compound which is a polypropylene glycol or an ethylene glycol.

Finally, there is a final category of calcium carbonate dry-grinding aid agents, which consists of single monomer-based copolymers of the (meth)acrylic acid type copolymerised with a monomer having an alkoxy or hydroxy polyalkyleneglycol group, which are those used in the present Application. The use of these copolymers, as calcium carbonate dry-grinding aid agents, is revealed by 3 French patent applications, which have not yet been published on the date of filing of the present Application, and filed as numbers: FR 05 11274, FR 05 12797 and FR 06 09535. These 3 documents disclose the possibility of dry grinding calcium carbonate in the presence of the copolymers used in the present invention. Conversely, none of them reveals the use of calcium carbonates obtained in this manner as an agent reducing the viscosity of a thermoplastic or thermosetting paste.

In conclusion, the state of the technique in relation to dry-grinding aid agents could not reveal or suggest to the skilled man in the art the solution forming the subject of the present invention.

This solution therefore consists in the use, as an agent reducing the viscosity of a paste consisting of a thermoplastic or thermosetting resin, and of calcium carbonate, of a calcium carbonate characterised in that the said carbonate is dry-ground in the presence of a grinding aid agent, firstly, and in that the grinding aid agent is, secondly, a copolymer consisting:
a) of at least one anionic monomer chosen from among acrylic acid, methacrylic acid and their blends,
b) and of at least one non-ionic monomer, of formula (I):

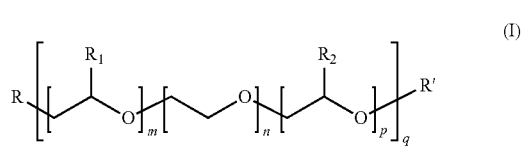

where:
m, n, p and q are integers such that: m, n, p≦150, q≧1, and 5≦(m+n+p)q≦150, and preferentially 15≦(m+n+p)q≦120, $R_1$ represents hydrogen or the methyl or ethyl radical, $R_2$ represents hydrogen or the methyl or ethyl radical, R represents a radical containing an unsaturated polymerisable function, preferentially belonging to the group of vinylics, or to the group of acrylic, methacrylic, maleic esters, or to the group of unsaturated urethanes such as acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide, R' represents hydrogen or a hydrocarbonated radical with 1 to 40 carbon atoms, preferentially 1 to 4 carbon atoms, where R' is very preferentially the methyl radical, or a blend of several monomers of formula (I), c) and possibly of at least one other monomer chosen from among (meth)acrylic anhydride, (meth)acrylamide, or from among the (meth)acrylic esters, such as preferentially the acrylates and methacrylates with 1 to 20 carbon atoms in their ester radical, such as very preferentially the methyl, ethyl, isopropyl, n-propyl, isobutyl, n-butyl, ter-butyl or 2-ethylhexyl acrylates, the methyl or ethyl methacrylates, the hydroxylated methacrylates such as the hydroxyethyl and hydroxypropyl methacrylates, or from among the aromatic vinylic monomers such as preferentially styrene, α-methylstyrene, styrene sulfonate, or acrylamido-2-methyl-2-propane-sulfonic acid, or from among the organophosphate monomers, such as preferentially the acrylate and methacrylate phosphates of ethylene glycol, or the acrylate and methacrylate phosphates of oxyethylene and/or oxypropylene glycol, and their blends.

This use is also characterised in that the said copolymer consists, expressed as a percentage by weight of the monomers (the sum of the percentages by weight of all the monomers equals 100%):

a) 0.5% to 50%, preferentially 1% to 25%, and very preferentially 5% to 20%, of at least one anionic monomer chosen from among acrylic acid, methacrylic acid and their blends, b) 50% to 99.5%, preferentially 75% to 99%, and very preferentially 80% to 95%, of at least one non-ionic monomer, of formula (I):

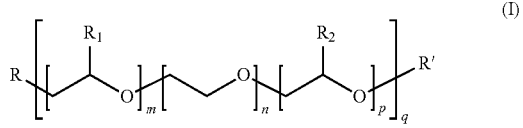

where:
m, n, p and q are integers such that: m, n, p≦150, q≧1, and 5≦(m+n+p)q≦150, and preferentially 15≦(m+n+p)q≦120, $R_1$ represents hydrogen or the methyl or ethyl radical, $R_2$ represents hydrogen or the methyl or ethyl radical, R represents a radical containing an unsaturated polymerisable function, preferentially belonging to the group of vinylics, or to the group of acrylic, methacrylic, maleic esters, or to the group of unsaturated urethanes such as acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide, R' represents hydrogen or a hydrocarbonated radical with 1 to 40 carbon atoms, preferentially 1 to 4 carbon atoms, where R' is very preferentially the methyl radical, or a blend of several monomers of formula (I), c) 0% to 50% of at least one other monomer chosen from among (meth)acrylic anhydride, (meth)acrylamide, or from among the (meth)acrylic esters, such as preferentially the acrylates and methacrylates with 1 to 20 carbon atoms in their ester radical, such as very preferentially the methyl, ethyl, isopropyl, n-propyl, isobutyl, n-butyl, ter-butyl or 2-ethylhexyl acrylates, the methyl or ethyl methacrylates, the hydroxylated methacrylates such as the hydroxyethyl and hydroxypropyl methacrylates, or from among the aromatic vinylic monomers such as preferentially styrene, α-methylstyrene, styrene sulfonate, or acrylamido-2-methyl-2-propane-sulfonic acid, or from among the organophosphate monomers, such as preferentially the acrylate and methacrylate phosphates of ethylene glycol, or the acrylate and methacrylate phosphates of oxyethylene and/or oxypropylene glycol, and their blends.

This use is also characterised in that the said copolymer is obtained in the acidic form and possibly distilled, and is possibly partially or totally neutralised by one or more neutralisation agents having a monovalent or polyvalent cation, where the said agents are chosen preferentially from among ammonia or from among calcium, magnesium hydroxides and/or oxides, or from among sodium, potassium or lithium hydroxides, or from among the aliphatic and/or cyclic primary, secondary or tertiary amines, such as preferentially stearylamine, the ethanolamines (mono-, di- and triethanolamine), mono- and diethylamine, cyclohexylamine, methylcyclohexylamine, amino methyl propanol, morpholine, and preferentially in that the neutralisation agent is chosen from among triethanolamine and sodium hydroxide.

This use is also characterised in that the said copolymer is obtained by processes of radical polymerisation in solution, in a direct or reverse emulsion, in suspension or precipitation in solvents, in the presence of catalytic systems and chain transfer agents, or again by processes of controlled radical polymerisation, and preferentially by nitroxide mediated polymerisation (NMP) or by cobaloximes, by atom transfer radical polymerisation (ATRP), by controlled radical polymerisation by sulphurated derivatives, chosen from among carbamates, dithioesters or trithiocarbonates (RAFT) or xanthates.

This use is also characterised in that the said copolymer may possibly, before or after the total or partial neutralisation reaction, be treated and separated into several phases, according to static or dynamic processes known to the skilled man in the art, by one or more polar solvents belonging preferentially to the group constituted by water, methanol, ethanol, propanol, isopropanol, the butanols, acetone and tetrahydrofuran or their blends.

One of the phases then corresponds to the polymer used according to the invention.

This use is also characterised in that 0.05% to 5%, preferentially 0.1% to 3%, and very preferentially 0.1% to 1%, by dry weight of the said copolymer relative to the dry weight of calcium carbonate is used during the dry grinding of the said carbonate.

In a first variant, this use is characterised in that the resin constituting the paste is a thermoplastic resin chosen from among the halogenated resins, such as preferentially PVC, chlorinated polyvinyl chloride (PVCC), vinylidene polyfluoride (PVDF), or chosen from among the styrenic resins, such as preferentially styrene-butadiene copolymers with a high styrene rate (HIPS), thermoplastic elastomers such as block copolymers of the Kraton™ type, resins of the styrene-acrylonitrile type, acrylate-butadiene-styrene resins, styrene methylmethacrylate copolymers, or chosen from among the acrylic resins, such as preferentially methyl polymethacrylate, or chosen from among the polyolefines, such as preferentially polyethylenes or polypropylenes, or chosen from among the polycarbonate resins, or chosen from among the polyamide resins, or chosen from among the thermoplastic polyesters or a blend of these resins, and in that the said resin very preferentially consists of PVC.

In a second variant, this use is characterised in that the resin constituting the paste is a thermosetting resin chosen from among the vulcanisable elastomers or latexes, the epoxide, polyurethane, or unsaturated polyester resins, and their blends, and in that the said resin is preferentially chosen from among the unsaturated or polyurethane polyester resins.

Another purpose of the invention consists of the thermoplastic or thermosetting pastes obtained by the use of dry-ground calcium carbonate according to the invention.

Another purpose of the invention consists of the thermoplastic or thermosetting parts obtained from the thermoplastic or thermosetting pastes according to the invention.

EXAMPLES

In all the examples, the molecular weight of the polymers used is determined according to the method explained below, by multi-detection steric exclusion chromatography (CES 3D).

The CES 3D chain is composed as follows:
online gas separator for mobile phase ERC 3112
Waters 515 or Viscotek VE1121 type isocratic pump
Waters 717+ automatic injector
Waters CHM oven for columns
set of 3 Waters Ultrahydrogel columns of length 30 cm and internal diameter 7.8 mm 1 linear column followed by 2 120 Å columns, with the entire system being preceded by a guard column of the same kind
set of detectors connected in parallel: Viscotek T60A combining LS and viscosimetry and Waters 2410 differential refractometer
IT system and application: Viscotek TriSEC 3.0 GPC software
Composition of the mobile phase:
preparation of a stock solution: $Na_2SO_4$ 666 mM, filtered at 0.1 µm
preparation of the mobile phase at 66.6 mM in $Na_2SO_4$ (i.e. an ionic force of 0.2M):
  10% by volume of the previous stock solution
  5% by volume of acetonitrile
  85% by volume of water at 18.2 MΩ
  pH adjusted to 9.0 by a few drops of sodium hydroxide N
Operational parameters:
flow rate: 0.8 ml/min
temperature of columns and of refractometer: 40° C.
injection volume: 100 µl
polymer concentration on injection: 2 to 4 mg/ml, as a function of the expected average of molar mass for each sample (optimisation of detectors' responses)
analysis time: 50 min
Calibration of detectors:
Use of two certified measurement standards:
Viscotek PEO22k, a measurement standard of low polymolecularity index (Ip) for actual calibration of the system
Viscotek Dextran T70k, a high-index measurement standard (Ip) for verification and fine adjustment of calibration.

Example 1

This example illustrates the use of dry-ground calcium carbonates, through the use of a grinding aid agent according to the prior art or according to the invention, in the manufacture of a paste consisting of a thermosetting resin which is an unsaturated polyester resin and of the said calcium carbonate.

To accomplish this one begins by grinding a calcium carbonate, which is an Italian marble, and the granulometric characteristics of which, as measured by sieving, are as follows:
  29.9% by weight of particles have an average diameter of less than 1 mm,
  8.5% by weight of the particles have an average diameter between 500 and 1,000 µm,
  17.5% by weight of the particles have an average diameter between 200 and 500 µm,
  17.7% by weight of the particles have an average diameter between 100 and 200 µm,
  27.7% by weight of the particles have an average diameter between 50 and 100 µm,
  15.6% by weight of particles have an average diameter of less than 50 µm.

This calcium carbonate is dry-ground, in a ball-mill, with grinding balls of the Cylpebs™ type. This grinding stage uses 0.15% by dry weight (relative to the dry weight of calcium carbonate) of a dry-grinding aid agent according to the invention or according to the prior art. The calcium carbonate ground in this manner is then subjected to a classifying operation in an air classifier of the Alpine™ 100 ATP type, sold by the company HOSOKAWA™, with its rotational speed being set at 7,000 revolutions/minute and its air flow rate at 300 m³/h. For each of the calcium carbonates obtained in this manner the percentages by weight of particles the average diameter of which is less than 1 µm and than 2 µm were then measured, respectively noted %<1 µm and %<2 µm; these values were reported in tables 1 to 3 at the end of this example.

After the grinding and classifying stages pastes were then produced by blending of 100 parts by dry weight of an unsaturated polyester resin sold by the company CRAY VALLEY™ under the name Norsodyne™ I 2984 V, and of 150 parts by dry weight of the previously obtained calcium carbonate. For each of the pastes obtained the Brookfield™ HBT viscosity was then determined, at 25° C. and at 50 revolutions/minute, with the appropriate moving part, using the technique well known to the skilled man in the art, and this viscosity was noted µ50 rpm. (mPa·s); these values were reported in tables 1 to 3 at the end of this example.

Tests No 1, 2 and 3

These tests illustrate the prior art, and use monopropylene glycol as a dry-grinding aid agent. In the dry-grinding stage, these 3 tests differ by the final granulometric characteristics of the calcium carbonates obtained, as indicated in table 1.

Test No. 4

This test illustrates the prior art, and uses triisopropylamine as a dry-grinding aid agent.

Test No. 5

This test illustrates the prior art, and uses 2-amino-2-methyl-1-propanol as a dry-grinding aid agent.

Test No. 6

This test illustrates the prior art, and uses as a dry-grinding aid agent a blend of 66% by weight of monopropylene glycol and of 33% by weight of triisopropylamine.

Test No. 7

This test illustrates the invention and uses as a dry-grinding aid agent a copolymer consisting of, expressed as a percentage by weight of each of the monomers:
  a) 3.9% of acrylic acid and 5.5% of methacrylic acid,
  b) 89.1% of a monomer of formula (I) in which $R_1$ and $R_2$ represent hydrogen, R represents the methacrylate group, R' represents the methyl radical, and with (m+n+p)q=45, and 1.5% of butoxy oxypropylated hemimaleate having 20 oxypropylated units,
totally neutralised by soda, and of molecular weight equal to 46,900 g/mole.

Test No. 8

This test illustrates the invention and uses as a dry-grinding aid agent a copolymer consisting of, expressed as a percentage by weight of each of the monomers:
  a) 1.5% of acrylic acid and 1.9% of methacrylic acid,
  b) 96.6% of a monomer of formula (I) in which $R_1$ and $R_2$ represent hydrogen, R represents the methacrylate group, R' represents the methyl radical, and with (m+n+p)q=113,
totally neutralised by soda, and of molecular weight equal to 49,300 g/mole.

Test No. 9

This test illustrates the invention and uses as a dry-grinding aid agent a copolymer consisting of, expressed as a percentage by weight of each of the monomers:
  a) 13.6% of acrylic acid and 4.9% of methacrylic acid,
  b) 81.5% of a monomer of formula (I) in which $R_1$ and $R_2$ represent hydrogen, R represents the methacrylate group, R' represents the methyl radical, and with (m+n+p)q=45,
not neutralised and of molecular weight equal to 45,300 g/mole.

Test No. 10

This test illustrates the invention and uses as a dry-grinding aid agent a copolymer consisting of, expressed as a percentage by weight of each of the monomers:
  a) 13.6% of acrylic acid and 4.9% of methacrylic acid,
  b) 81.5% of a monomer of formula (I) in which $R_1$ and $R_2$ represent hydrogen, R represents the methacrylate group, R' represents the methyl radical, and with (m+n+p)q=45,
50% of which by mole of the carboxylic sites were neutralised by soda, and of molecular weight equal to 45,000 g/mole.

Test No. 11

This test illustrates the invention and uses as a dry-grinding aid agent a copolymer consisting of, expressed as a percentage by weight of each of the monomers:
  a) 13.6% of acrylic acid and 4.9% of methacrylic acid,
  b) 81.5% of a monomer of formula (I) in which $R_1$ and $R_2$ represent hydrogen, R represents the methacrylate group, R' represents the methyl radical, and with (m+n+p)q=45,
50% of which by mole of the carboxylic sites were neutralised by magnesium hydroxide, and of molecular weight equal to 46,300 g/mole.

Test No. 12

This test illustrates the invention and uses as a dry-grinding aid agent a copolymer consisting of, expressed as a percentage by weight of each of the monomers:
  a) 13.6% of acrylic acid and 4.9% of methacrylic acid,
  b) 81.5% of a monomer of formula (I) in which $R_1$ and $R_2$ represent hydrogen, R represents the methacrylate group, R' represents the methyl radical, and with (m+n+p)q=45,
25% of which by mole of the carboxylic sites were neutralised by potassium hydroxide, and of molecular weight equal to 45,800 g/mole.

Test No. 13

This test illustrates the invention and uses as a dry-grinding aid agent a copolymer consisting of, expressed as a percentage by weight of each of the monomers:
  a) 13.6% of acrylic acid and 4.9% of methacrylic acid,
  b) 81.5% of a monomer of formula (I) in which $R_1$ and $R_2$ represent hydrogen, R represents the methacrylate group, R' represents the methyl radical, and with (m+n+p)q=45,
totally neutralised by soda, and of molecular weight equal to 44,700 g/mole.

Test No. 14

This test illustrates the invention and uses as a dry-grinding aid agent a copolymer consisting of, expressed as a percentage by weight of each of the monomers:
  a) 13.6% of acrylic acid and 4.9% of methacrylic acid,
  b) 81.5% of a monomer of formula (I) in which $R_1$ and $R_2$ represent hydrogen, R represents the methacrylate group, R' represents the methyl radical, and with (m+n+p)q=17,
totally neutralised by soda, and of molecular weight equal to 28,300 g/mole.

Test No. 15

This test illustrates the invention and uses as a dry-grinding aid agent a copolymer consisting of, expressed as a percentage by weight of each of the monomers:
  a) 13.6% of acrylic acid and 4.9% of methacrylic acid,
  b) 81.5% of a monomer of formula (I) in which $R_1$ and $R_2$ represent hydrogen, R represents the methacrylate group, R' represents the methyl radical, and with (m+n+p)q=67,
totally neutralised by soda, and of molecular weight equal to 44,900 g/mole.

Test No. 16

This test illustrates the invention and uses as a dry-grinding aid agent a copolymer consisting of, expressed as a percentage by weight of each of the monomers:
  a) 13.6% of acrylic acid and 4.9% of methacrylic acid,
  b) 76.5% of a monomer of formula (I) in which $R_1$ and $R_2$ represent hydrogen, R represents the methacrylate group, R' represents the methyl radical, and with (m+n+p)q=45,
  c) 5% of acrylamide,
totally neutralised by soda, and of molecular weight equal to 46,100 g/mole.

Test No. 17

This test illustrates the invention and uses as a dry-grinding aid agent a copolymer consisting of, expressed as a percentage by weight of each of the monomers:
  a) 13.6% of acrylic acid and 4.9% of methacrylic acid,
  b) 71.5% of a monomer of formula (I) in which $R_1$ and $R_2$ represent hydrogen, R represents the methacrylate group, R' represents the methyl radical, and with (m+n+p)q=45,
c) 10% of ethyl acrylate,
totally neutralised by soda, and of molecular weight equal to 45,300 g/mole.

Test No. 18

This test illustrates the invention and uses as a dry-grinding aid agent a copolymer consisting of, expressed as a percentage by weight of each of the monomers:
a) 5.7% of acrylic acid and 1.8% of methacrylic acid,
b) 92.5% of a monomer of formula (I) in which $R_1$ and $R_2$ represent hydrogen, R represents the methacrylate group, R' represents the methyl radical, and with (m+n+p)q=113,
totally neutralised by soda, and of molecular weight equal to 36,000 g/mole.

Test No. 19

This test illustrates the invention and uses as a dry-grinding aid agent a copolymer consisting of, expressed as a percentage by weight of each of the monomers:
a) 13.6% of acrylic acid and 4.9% of methacrylic acid,
b) 81.5% of a monomer of formula (I) in which $R_1$ and $R_2$ represent hydrogen, R represents the methacrylate group, R' represents the methyl radical, and with (m+n+p)q=45,
totally neutralised by soda, and of molecular weight equal to 28,000 g/mole.

Test No. 20

This test illustrates the invention and uses as a dry-grinding aid agent a copolymer consisting of, expressed as a percentage by weight of each of the monomers:
a) 6% of acrylic acid and 1.8% of methacrylic acid,
b) 92.2% of a monomer of formula (I) in which $R_1$ and $R_2$ represent hydrogen, R represents the methacrylate group, R' represents the methyl radical, and with (m+n+p)q=113,
totally neutralised by soda, and of molecular weight equal to 1,563,000 g/mole.

Test No. 21

This test illustrates the invention and uses as a dry-grinding aid agent a copolymer consisting of, expressed as a percentage by weight of each of the monomers:
a) 6% of acrylic acid and 1.8% of methacrylic acid,
b) 92.2% of a monomer of formula (I) in which $R_1$ and $R_2$ represent hydrogen, R represents the methacrylate group, R' represents the methyl radical, and with (m+n+p)q=113,
totally neutralised by soda, and of molecular weight equal to 570,000 g/mole.

Test No. 22

This test illustrates the invention and uses as a dry-grinding aid agent a copolymer consisting of, expressed as a percentage by weight of each of the monomers:
a) 6% of acrylic acid and 1.8% of methacrylic acid,
b) 92.2% of a monomer of formula (I) in which $R_1$ and $R_2$ represent hydrogen, R represents the methacrylate group, R' represents the methyl radical, and with (m+n+p)q=113,
totally neutralised by soda, and of molecular weight equal to 1,019,000 g/mole.

TABLE 1

|  |  | Test n° | | | | | |
|---|---|---|---|---|---|---|---|
|  |  | 1 | 2 | 3 | 4 | 5 | 6 |
| Prior Art/Invention (PA/IN) |  | PA | PA | PA | PA | PA | PA |
| ground CaCO3 | % < 1 μm | 21 | 13 | 22 | 23 | 22 | 23 |
|  | % < 2 μm | 50 | 31 | 60 | 58 | 59 | 59 |
| filled polyester paste | μ 50 rpm (mPa·s) | 7300 | 7100 | 7500 | 9800 | 9300 | 8700 |

TABLE 2

|  |  | Test n° | | | | | | | |
|---|---|---|---|---|---|---|---|---|---|
|  |  | 7 | 8 | 9 | 10 | 11 | 12 | 13 | 14 |
| Prior Art/Invention (PA/IN) |  | IN | IN | IN | IN | IN | IN | IN | IN |
| ground CaCO3 | % < 1 μm | 28 | 27 | 29 | 29 | 30 | 27 | 28 | 29 |
|  | % < 2 μm | 68 | 70 | 72 | 69 | 70 | 68 | 69 | 70 |
| filled polyester paste | μ 50 rpm (mPa·s) | 6200 | 6800 | 5900 | 6050 | 5850 | 5900 | 5950 | 5850 |

TABLE 3

|  |  | Test n° | | | | | | | |
|---|---|---|---|---|---|---|---|---|---|
|  |  | 15 | 16 | 17 | 18 | 19 | 20 | 21 | 22 |
| Prior Art/Invention (PA/IN) |  | IN | IN | IN | IN | IN | IN | IN | IN |
| ground CaCO3 | % < 1 μm | 30 | 31 | 29 | 28 | 29 | 27 | 28 | 30 |
|  | % < 2 μm | 68 | 70 | 69 | 69 | 68 | 68 | 68 | 68 |
| filled polyester paste | μ 50 rpm (mPa·s) | 5600 | 5750 | 5850 | 5400 | 6600 | 3900 | 4100 | 4150 |

A comparison between the values of µ50 rpm of table 1 and of tables 2 and 3 shows that the use in a polyester paste of calcium carbonate ground according to the invention enabled the Brookfield™ viscosity of the paste filled in this manner to be reduced advantageously, relative to the same paste filled with a calcium carbonate ground with a grinding aid agent according to the prior art.

This result is particularly surprising in that the calcium carbonates ground according to the prior art are "coarser" than the calcium carbonate used according to the invention, as is demonstrated by their granulometric characteristics.

And, in principle, the skilled man in the art knows that for 2 carbonates obtained from the same grinding aid agent, the coarser of the two leads to the lower viscosity of the polyester paste in which it is incorporated (a check is thus made that for carbonates ground with the same grinding aid agent the viscosity is reduced between tests 3 and 1, and then between tests 1 and 2, which indeed corresponds to a coarser carbonate in test 1 than in test 3, and to a coarser carbonate in test 2 than in test 1).

Example 2

This example illustrates the use of dry-ground calcium carbonates, through the use of a grinding aid agent according to the prior art or according to the invention, in the manufacture of a paste consisting of a polyol and of the said calcium carbonate. One of the aims of this example is to demonstrate that by this means it is possible to reduce the viscosity of the filled polyol paste, which will subsequently enable a reduction of the viscosity of the polyurethane paste resulting from the blend between a polyisocyanate and this filled polyol paste of reduced viscosity.

In order to accomplish this, a calcium carbonate which is an Italian marble, the granulometric characteristics of which are identical to those given in example 1, is ground and then classified, the grinding and classifying stages being identical to those described in example 1. This grinding uses 0.15% by dry weight (relative to the dry weight of calcium carbonate) of a dry-grinding aid agent according to the invention or according to the prior art. For each of the calcium carbonates obtained in this manner the percentages by weight of particles the average diameter of which is less than 1 µm and than 2 µm, respectively noted %<1 µm and %<2 µm, were measured.

After the grinding and selection stages pastes were then produced by blending according to the methods well known to the skilled man in the art of 100 parts by dry weight of a polyol sold by the company DOW PLASTICS™ under the name Voranol™ 3322, and of 100 parts by dry weight of the previously obtained calcium carbonate. For each of the pastes obtained the Brookfield™ HBT viscosities were then determined, at 25° C. and at 10, 50 and 100 revolutions/minute, with the appropriate moving part, using the technique well known to the skilled man in the art, and these viscosities were noted µ10 rpm, µ50 rpm, µ100 rpm.

Tests No. 23

This test illustrates the prior art, and uses monopropylene glycol as a dry-grinding aid agent.

Test No. 24

This test illustrates the prior art, and uses 2-amino-2-methyl-1-propanol as a dry-grinding aid agent.

Test No. 25

This test illustrates the prior art, and uses triisopropylamine as a dry-grinding aid agent.

Test No. 26

This test illustrates the prior art, and uses as a dry-grinding aid agent a blend of 66% by weight of monopropylene glycol and of 33% by weight of triisopropylamine.

Test No. 27

This test illustrates the invention and uses as a dry-grinding aid agent a copolymer consisting of, expressed as a percentage by weight of each of the monomers:
  a) 6% of acrylic acid and 1.8% of methacrylic acid,
  b) 92.2% of a monomer of formula (I) in which $R_1$ and $R_2$ represent hydrogen, R represents the methacrylate group, R' represents the methyl radical, and with (m+n+p)q=113,
totally neutralised by soda, and of molecular weight equal to 1,563,000 g/mole.

Test No. 28

This test illustrates the invention and uses as a dry-grinding aid agent a copolymer consisting of, expressed as a percentage by weight of each of the monomers:
  a) 13.6% of acrylic acid and 4.9% of methacrylic acid,
  b) 81.5% of a monomer of formula (I) in which $R_1$ and $R_2$ represent hydrogen, R represents the methacrylate group, R' represents the methyl radical, and with (m+n+p)q=45,
totally neutralised by soda, and of molecular weight equal to 44,700 g/mole.

TABLE 4

| | | Test n° | | | | | |
|---|---|---|---|---|---|---|---|
| | | 23 | 24 | 25 | 26 | 27 | 28 |
| Prior Art/Invention (PA/IN) | | PA | PA | PA | PA | IN | IN |
| ground CaCO3 | % < 1 µm | 22 | 23 | 22 | 23 | 28 | 29 |
| | % < 2 µm | 58 | 58 | 59 | 59 | 68 | 69 |
| Filled Polyol | µ 50 rpm (mPa · s) | 9000 | 9300 | 8800 | 9300 | 7600 | 6700 |
| | µ 100 rpm (mPa · s) | 6800 | 6800 | 6600 | 7100 | 5700 | 5100 |

These results demonstrate that the use of calcium carbonates dry-ground in the presence of grinding aid agents according to the invention notably enables the Brookfield™ viscosities of the filled polyol compositions to be reduced, comparatively with coarser calcium carbonates on the one hand, and ground with grinding aid agents according to the prior art, on the other. It will therefore be possible advantageously to use these filled polyol pastes to reduce the viscosity of polyurethane pastes with polyisocyanates bases, and of these filled polyol pastes.

Example 3

This example illustrates the use of dry-ground calcium carbonates, through the use of a grinding aid agent according to the prior art or according to the invention, in the manufacture of a thermoplastic paste consisting of PVC, dioctyl phthalate, and of the said calcium carbonate.

In order to accomplish this, a calcium carbonate which is an Italian marble, the granulometric characteristics of which are identical to those given in example 1, is ground and then classified, the grinding and classifying stages being identical to those described in example 1. This grinding uses 0.15% by dry weight (relative to the dry weight of calcium carbonate) of a dry-grinding aid agent according to the invention or according to the prior art. For each of the calcium carbonates obtained in this manner the percentages by weight of particles the average diameter of which is less than 1 μm and than 2 μm, respectively noted %<1 μm and %<2 μm, were measured.

After the grinding and selection stages pastes were then produced by blending according to the methods well known to the skilled man in the art of 100 parts by dry weight of a PVC sold by the company ARKEMA™ under the name Lacovyl™ PB 1702, of 75 parts by dry weight of dioctyl phthalate, and of 50 parts by dry weight of the previously obtained calcium carbonate. For each of the pastes obtained the Brookfield™ HBT viscosities were then determined, at 25° C. and at 10, 50 and 100 revolutions/minute, with the appropriate moving part, using the technique well known to the skilled man in the art, and these viscosities were noted μ10 rpm, μ50 rpm, μ100 rpm.

Tests No 29

This test illustrates the prior art, and uses monopropylene glycol as a dry-grinding aid agent.

Test No. 30

This test illustrates the prior art, and uses 2-amino-2-methyl-1-propanol as a dry-grinding aid agent.

Test No. 31

This test illustrates the prior art, and uses triisopropylamine as a dry-grinding aid agent.

Test No. 32

This test illustrates the prior art, and uses as a dry-grinding aid agent a blend of 66% by weight of monopropylene glycol and of 33% by weight of triisopropylamine.

Test No. 33

This test illustrates the invention and uses as a dry-grinding aid agent a copolymer consisting of, expressed as a percentage by weight of each of the monomers:
 a) 6% of acrylic acid and 1.8% of methacrylic acid,
 b) 92.2% of a monomer of formula (I) in which $R_1$ and $R_2$ represent hydrogen, R represents the methacrylate group, R' represents the methyl radical, and with (m+n+p)q=113,
totally neutralised by soda, and of molecular weight equal to 1,563,000 g/mole.

Test No. 34

This test illustrates the invention and uses as a dry-grinding aid agent a copolymer consisting of, expressed as a percentage by weight of each of the monomers:
 a) 13.6% of acrylic acid and 4.9% of methacrylic acid,
 b) 81.5% of a monomer of formula (I) in which $R_1$ and $R_2$ represent hydrogen, R represents the methacrylate group, R' represents the methyl radical, and with (m+n+p)q=45,
totally neutralised by soda, and of molecular weight equal to 44,700 g/mole.

TABLE 5

| | | Test n° | | | | | |
|---|---|---|---|---|---|---|---|
| | | 29 | 30 | 31 | 32 | 33 | 34 |
| Prior Art/Invention (PA/IN) | | PA | PA | PA | PA | IN | IN |
| ground CaCO3 | % < 1 μm | 22 | 23 | 22 | 23 | 28 | 29 |
| | % < 2 μm | 58 | 58 | 59 | 59 | 68 | 69 |
| Filled PVC | μ 50 rpm (mPa · s) | 15700 | 14400 | 12400 | 14300 | 12400 | 9300 |
| | μ 100 rpm (mPa · s) | 11200 | 10800 | 10000 | 10300 | 9600 | 7500 |

These results demonstrate that the use of calcium carbonates dry-ground in the presence of grinding aid agents according to the invention notably enables the Brookfield™ viscosities of the filled PVC compositions to be reduced, comparatively with coarser calcium carbonates on the one hand, and ground with grinding aid agents according to the prior art, on the other.

The invention claimed is:

1. A method for reducing the viscosity of a paste comprising a thermoplastic or thermosetting resin and calcium carbonate,
 (1) comprising dry-grinding calcium carbonate in the presence of a copolymer grinding aid agent obtained from monomers comprising:
  a) at least one anionic monomer chosen from acrylic acid, methacrylic acid and their blends,
  b) and at least one non-ionic monomer, of formula (I):

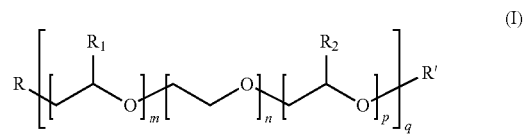

where:
  m, n, p and q are integers such that: m, n, p≦150, q≧1, and 5≦(m+n+p)q≦150,
  $R_1$ represents hydrogen or the methyl or ethyl radical,
  $R_2$ represents hydrogen or the methyl or ethyl radical,
  R represents a radical containing an unsaturated polymerisable function chosen from the group of vinylics, the group of acrylic, methacrylic, and maleic esters, the group of unsaturated urethanes selected from the group consisting of acrylurethane, methacrylurethane, α-α' dimethyl-isopropenyl-benzylurethane, and allylurethane, the group of allylic or vinylic ethers, whether or not substituted, the group of ethylenically unsaturated amides or imides, and the group consisting of acrylamide and methacrylamide, and
  R' represents hydrogen or a hydrocarbonated radical with 1 to 40 carbon atoms,
 or a blend of several monomers of formula (I),
  c) and optionally at least one other monomer chosen from (meth)acrylic anhydride and (meth)acrylamide, the esters chosen from the acrylates and methacrylates with 1 to 20 carbon atoms in their ester radical, and the hydroxylated methacrylates selected from the hydroxyethyl and hydroxypropyl methacrylates, the aromatic vinylic monomers chosen from styrene, α-methylstyrene, and styrene sulfonate, and acrylamido-2-methyl-2-propane -sulfonic acid, the organophosphate monomers chosen from the acrylate and methacrylate phosphates of ethylene glycol, and the acrylate and methacrylate phosphates of oxyethylene and/or oxypropylene glycol, and their blends, and
 (2) adding said dry-ground calcium carbonate to said resin, thereby forming a paste of reduced viscosity.

2. The method according to claim 1, wherein said copolymer comprises, expressed as a percentage by weight of the monomers in which the sum of the percentages by weight of all the monomers equals 100%:
  0.5% to 50% of component a),
  50% to 99.5% of component b), and
  0% to 50% of component c).

3. The method according to claim 1, wherein said copolymer is obtained in the acidic form and optionally distilled, and is optionally partially or totally neutralised by one or more neutralisation agents having a monovalent or polyvalent cation, where said agents are chosen from ammonia, and calcium and magnesium hydroxides and/or oxides, sodium, potassium and lithium hydroxides, and the aliphatic and/or cyclic primary, secondary or tertiary amines chosen from stearylamine, the ethanolamines, mono- and diethylamine, cyclohexylamine, methylcyclohexylamine, amino methyl propanol, and morpholine.

4. The method according to claim 1, wherein said copolymer is obtained by a polymerization process chosen from radical polymerisation in solution, in a direct or reverse emulsion, in suspension or precipitation in solvents, in the presence of catalytic systems and chain transfer agents, or a process of controlled radical polymerisation, chosen from nitroxide mediated polymerisation or cobaloximes, atom transfer radical polymerisation, and controlled radical polymerisation by sulphurated derivatives, chosen from carbamates, dithioesters or trithiocarbonates or xanthates.

5. The method according to claim 3, wherein said copolymer is, before or after the total or partial neutralisation reaction, treated and separated into several phases, according to static or dynamic processes, by one or more polar solvents selected from the group consisting of water, methanol, ethanol, propanol, isopropanol, the butanols, acetone, tetrahydrofuran and their blends.

6. The method according to claim 1, wherein 0.05% to 5% by dry weight of the said copolymer relative to the dry weight of calcium carbonate is used during the dry grinding of the said carbonate.

7. The method according to claim 1, wherein the resin constituting the paste is a thermoplastic resin chosen from PVC, chlorinated polyvinyl chloride, vinylidene polyfluoride, styrenic resins, and thermoplastic elastomers, resins of the styrene-acrylonitrile type, acrylate-butadiene-styrene resins, styrene methylmethacrylate copolymers, acrylic resins, the polyolefines, the polycarbonate resins, the polyamide resins, and the thermoplastic polyesters and a blend of these resins.

8. The method according to claim 1, wherein the resin constituting the paste is a thermosetting resin chosen from the vulcanisable elastomers or latexes, the epoxide, polyurethane, or unsaturated polyester resins, and their blends.

9. The method according to claim 1, wherein $15 \leqq (m+n+p)q \leqq 120$.

10. The method according to claim 2, wherein said copolymer comprises, expressed as a percentage by weight of the monomers in which the sum of the percentages by weight of all the monomers equals 100%:
   1% to 25% of component a), and
   75% to 99% of component b).

11. The method according to claim 2, wherein said copolymer comprises, expressed as a percentage by weight of the monomers in which the sum of the percentages by weight of all the monomers equals 100%:
   5% to 20% of component a), and
   80% to 95% of component b).

12. The method according to claim 1, wherein R' represents a hydrocarbonated radical with 1 to 4 carbon atoms.

13. The method according to claim 1, wherein R' represents a methyl radical.

14. The method according to claim 1, wherein $R_1$ and $R_2$ represent hydrogen, R represents a methacrylate group, and R' represents a methyl radical.

15. The method according to claim 6, wherein 0.1% to 3% by dry weight of the said copolymer relative to the dry weight of calcium carbonate is used during the dry grinding of the said carbonate.

16. The method according to claim 6, wherein 0.1% to 1% by dry weight of the said copolymer relative to the dry weight of calcium carbonate is used during the dry grinding of the said carbonate.

17. The method according to claim 8, wherein the thermosetting resin comprises an unsaturated polyester resin.

18. The method according to claim 8, wherein the thermosetting resin comprises a polyurethane resin.

19. The method according to claim 7, wherein the thermoplastic resin comprises a PVC resin.

* * * * *